Figure 1:
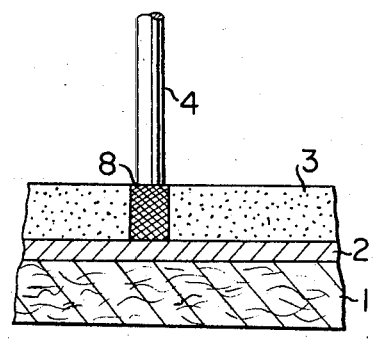

United States Patent [19]

Sekine

[11] 3,871,972
[45] Mar. 18, 1975

[54] ELECTRORECORDING SHEET
[75] Inventor: Yoichi Sekine, Katano, Japan
[73] Assignee: Matsushita Electric Industrial Co., Ltd., Osaka, Japan
[22] Filed: Jan. 3, 1973
[21] Appl. No.: 320,821

[30] Foreign Application Priority Data
Mar. 24, 1972 Japan.............................. 47-30088

[52] U.S. Cl..................... 204/2, 117/36.8, 346/135
[51] Int. Cl. ....................... B41m 5/20, G01d 15/34
[58] Field of Search ............. 204/2; 117/36.2, 36.8, 117/36.9; 346/1, 76 R, 135; 219/216, 229

[56] References Cited
UNITED STATES PATENTS
3,411,948 11/1968 Reis ........................................ 204/2
3,434,878 3/1969 Reis ........................................ 204/2
3,518,038 6/1970 Spatz et al. ............................ 204/2
3,772,159 11/1973 Sakata et al. .......................... 204/2

Primary Examiner—T. M. Tufariello
Attorney, Agent, or Firm—Stevens, Davis, Miller & Mosher

[57] ABSTRACT

An electrorecording sheet in which an electroconductive layer comprising cuprous iodide is provided in contact with a color forming layer containing a component which shows visual color change or color formation upon application of heat energy thereto. When current is applied to the color forming layer through said electroconductive layer, selective visible recording is obtained in the current-applied area of said color forming layer.

10 Claims, 2 Drawing Figures

ELECTRORECORDING SHEET

The present invention relates to an electrorecording sheet which directly converts an electric signal into a visible image and in which a layer of cuprous iodide as an electroconductive layer is provided in contact with a color forming layer capable of providing a visible record when current is applied thereto.

Recently, the process for direct conversion of an electric signal into a visible image has abruptly been diversified. At present, such methods as ink recording, photochemical recording, electrolytic recording, heat sensitive recording, spark destructive recording, etc. have been employed, but these have merits and demerits.

For this purpose, such recording sheets are desired which can be used in the light, can attain a recording of high gradient at high speed, can be stably stored without discoloration or fading, are inexpensive and require no such operations as change of head, supply of ink, etc.

The present invention provides an electrorecording sheet which substantially meets the above mentioned requirements. This electrorecording sheet comprises an electroconductive layer of cuprous iodide having applied thereon a color forming layer containing a substance capable of causing color formation or visual color change due to electrochemical reaction or heat energy which results when current corresponding to the electric signal is passed therethrough. This recording sheets forms a colored visible image near a recording needle electrode on the color forming layer due to electrochemical oxidation, reduction or formation of heat energy by applying current between the recording needle electrode and an opposite electrode which are allowed to contact with the recording sheet.

The spark destructive recording sheet which resembles the present recording sheet can also attain a high speed recording. However, since the spark destructive recording sheet uses carbon or metal film formed by vacuum evaporation as an electroconductive layer, it cannot be made into a copying base paper which utilizes transmitting light. Moreover, the color forming mechanism of the spark destructive recording sheet is that a masking layer is removed by spark to make a colored layer therebelow visible. Therefore, a large amount of pigment is required for masking the electroconductive layer of carbon or a metal and the colored layer and this necessarily causes generation of bad smell and recording sludge due to spark at recording.

On the other hand, since in the electrorecording sheet of the present invention, a white or light yellow layer of cuprous iodide is used as an electroconductive layer and color formation or color change of a color forming layer is caused by application of current, neither colored layer nor masking layer are necessary and substantially no formation of bad smell, recording sludges or smoke due to electric sparking is caused and the present recording sheet can be used for a copying base paper which utilizes transmitting light. Furthermore, since cuprous iodide is hardly influenced by temperature or humidity of atmosphere, no storage container which is necessary in wet recording is required and recording can be carried out always under constant conditions.

Next, the present invention will be further detailedly explained with reference to the drawings attached hereto.

Figure 2:
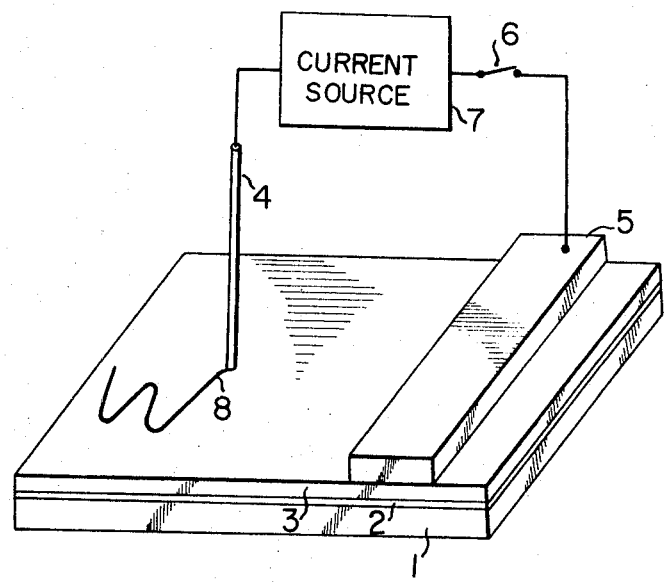

FIG. 1 is a drawing which shows a fundamental construction of the recording sheet of the present invention and FIG. 2 is a drawing which illustrates a recording method using said recording sheet.

In FIGS. 1 and 2, 1 is a support such as paper, fabric, glass, plastic film, etc. and 2 is an electroconductive layer comprising cuprous iodide. This electroconductive layer can be produced by vacuum evaporation of cuprous iodide onto the surface of support 1 or by dispersing fine particles of cuprous iodide in an appropriate binder solution and coating the solution on the surface of support 1. This binder must be one which does not melt during storage. Preferable binders are those which do not melt at a temperature less than 70°C.

The surface resistivity of the electroconductive layer 2 is the lower, the better and is preferably less than $10^6 \Omega$ at 20°C and at a relative humidity of 65 percent.

3 is a color forming layer containing a component which is capable of color forming with mainly heat energy generated when current corresponding to electric signal to be recorded is applied. This color forming component will be detailedly explained hereinafter.

4 is a recording needle electrode and 5 is a face electrode which is an opposite electrode of said needle electrode. When switch 6 is closed, electric current is caused to pass between the two electrodes through color forming layer 3 and electroconductive layer 2 from alternating current or direct current source to obtain colored recording 8 at the selectively current-applied area of color forming layer 3, namely, at the recording needle electrode.

In FIG. 1, color forming layer 3 is provided on the surface of electroconductive layer 2, but the electroconductive layer can be provided on the surface of the color forming layer.

Materials used in the present invention will be explained below.

1. HEAT RECORDING MATERIALS

These cause color formation by heat energy generated when electric current is applied. One of them utilizes coupling due to formation of reaction product of an electron donor and an electron acceptor. For example, ferric stearate as an electron donor and pyrogallol as an electron acceptor are separately dispersed in a binder and the binder is softened with heat to melt ferric stearate, thereby to attain recording. In this case, dark brown colored record is obtained. These heat recording materials include combination of leuco form of triphenylmethane dyes such as crystal violet lactone or leuco form of fluoran dyes and an organic acid or a phenolic acidic material or combination of an organic compound having metal ion and an organic spot test reagent. These dyes and organic acid and organic metal compound and organic spot test reagent are separately dispersed in a binder.

a. Color forming dyes

Leuco form of triphenylmethane dyes represented by the following general formula (I) or leuco form of fluoran dyes represented by the following general formula (II) are generally used.

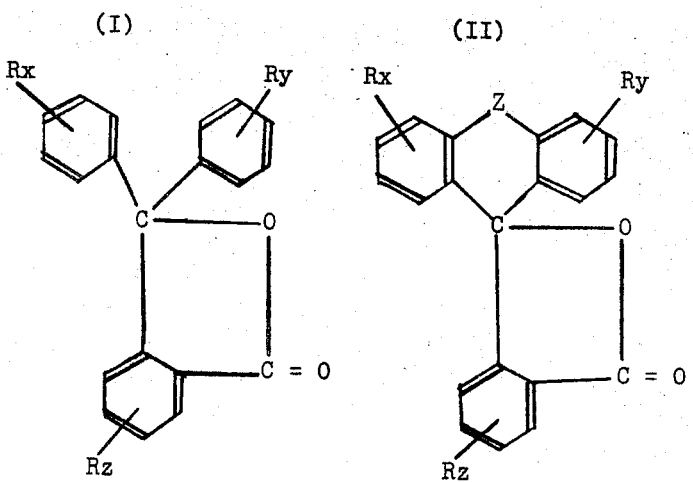

(wherein Rx, Ry and Rz are selected from the group consisting of hydrogen, hydroxy, halogen, alkyl, nitro, amino, dialkylamino, monoalkylamino and allyl and Z is O or S which is necessary for forming a heterocyclic ring.

Examples of the above compounds are as follows:
Compounds represented by the formula (I)
3,3-bis(p-dimethylaminophenyl)-phthalide;
3,3-bis(p-dimethylaminophenyl)-6-dimethylaminophthalide (crystal violet lactone);
3,3-bis(p-dimethylaminophenyl)-6-aminophthalide;
3,3-bis(p-dimethylaminophenyl)-6-nitrophthalide;
3,3-bis(p-dibutylaminophenyl)-phthalide;
3,3-bis(p-dimethylaminophenyl)-4,5,6,7-tetrachlorophthalide
Compounds represented by the formula (II)
3-dimethylamino-6-methoxyfluoran;
7-acetoamino-3-dimethylaminofluoran;
3-dimethylamino-5,7-dimethylfluoran;
3-diethylamino-5,7-dimethylfluoran;
3,6-bis-β-methoxyethoxyfluoran;
3,6-bis-β-cyanoethoxyfluoran;
Other lactam compounds:
Lactam (Rhodamine B lactam) of 9-p-nitroanilino-3,6-bis(diethylamino)-9-xanthenyl-o-benzoic acid;
Lactam of 9-p-nitroanilino-3,6-bis(dimethylamino)-9-thioxanthenyl-o-benzoic acid;

The above enumerated dye bases are effective and hardly dissolve in water and can be ground into less than 10 μ.

b. Color forming agent

As the color forming agents which react with the color forming dyes mentioned in the above (a) to form dyes, phenolic compounds or organic acids are preferred. These are preferably solid at normal temperature and liquefied or gasified at higher than 70°C.

1. PHENOLIC COMPOUNDS 3,5-xylenol; thymol; 4-tertiary-butyl phenol;
4-hydroxyphenoxide; methyl-4-hydroxybenzoate;
4-hydroxyacetophenone; α-naphthol; β-naphthol;
catechol; hydroquinone; resorcin; 4-tertiaryoctyl catechol; 4,4'-secondarybutylidenediphenol;
2,2'-dihydroxydiphenyl; 2,2'-methylene bis (4-methyl-6-tertiarybutyl phenol); 2,2'-bis(4-oxyphenyl)-propane; 4,4'-isopropylidene bis(2-tertiarybutyl phenol); 4,4'-secondarybutylidene diphenol; pyrogallol; 4,4'-isopropylidenediphenol.

2. ORGANIC ACIDS

Stearic acid; gallic acid; benzoic acid;
salicyclic acid; succinic acid; 1-oxy-2-naphthol acid;
2-oxy-p-toluylic acid; o-oxybenzoic acid;
m-oxybenzoic acid; p-oxybenzoic acid; 4-oxyphthalic acid.

c. Organic spot test reagents and organic metal salts

The organic spot test reagents herein referred to are those which react with metal ion to result in coloration or change in color and a great number of substances are known as said reagents. However, since the fact that at least one of the two are molten by heat energy generated upon application of electric current and the two react with each other to form color is utilized, it is preferred that one of them which has lower melting point is solid at lower than 70°C and has a melting point of lower than 150°C. For this reason, organic metal salt (metallic soap) is the most suitable. Combinations of the organic spot test reagents and the metal are as follows:

1. Organic spot test reagents: Metal
Diphenylthiocarbazide: Cu, Fe, Mg, Hg
Dimethylglyoxime: Cu, Fe, Ni
Benzoinoxime: Cu
8-Hydroxyquinoline: Cd, Cu, Fe, Pb, Mn, Ni, Zn
Dinitrodiphenylcarbazide: Cd
Rhodamine: Cu, Hg
Diphenylthiocarbasone: Cu, Ba, Co, Fe, Pb, Hg, Zn
Diphenylcarbasone: Co, Cu, Pb, Mg, Mn, Hg, Ni, Zn
Dithioxamide: Co, Cu, Pb, Ni
2-Mercapto-4-phenylthiazole: Co, Pb
3,5-Dimethylpyrazol: Co
α-Naphthylaminedithiocarbamic acid: Co, Fe
Benzoinoxime: Cu
Benzidine: Cu, Pb, Mn
p-dimethylaminobenzilidene rhodamine: Cu, Fe, Mg, Hg
Salicylaldoxime: Cu, Pb
Triphenyl thiophosphate: Ni
p,p'-Tetramethyldiaminodiphenylmethane: Pb, Mn
Anthranilic acid: Zn
Diphenylbenzidine: Zn
Catechol: Fe
Gallic acid: Fe
Dihydroxynaphthalene: Fe
Alizarin: Cu
Quinalizarin: Cu
2. Organic metal salts Metallic soaps containing metal ion as mentioned before are effective. Typical combinations of the organic spot test reagents and the organic metal salts and formed color are shown below.

Organic spot test reagents: Organic metal salts (color)
Dimethylglyoxime: Nickel stearate (Pink color)
Benzoinoxime: Copper myristate (Yellowish green)
Dithioxamide: Nickel stearate (Purple)
8-Hydroxyquinoline: Ferric oleate (Black)
Gallic acid: Ferric stearate (Black)
Alizarin: Copper oleate (Purple red)
Quinalizarin: Copper oleate (Purple red)
Diphenylcarbasone: Ferric stearate (Red)
Diphenylcarbasone: Cadmium stearate (Red)
Diphenylcarbazone: Copper myristate (Purple)
Diphenylcarbazone: Zinc palmitate (Deep red)
Diphenylthiocarbazide: Mercuric stearate (Purple)
Diphenylthiocarbazide: Lead myristate (Deep red)

d. It has been found that materials which have been known as oxidation-reduction indicator form color at the portion at a recording needle upon application of electric current and it has been confirmed that they are effective as color forming materials of electrorecording sheet. The oxidation-reduction indicators used herein are those which are oxidized by heat generated upon application of electric current to form color or change color and are all in leuco form. The oxidation-reduction indicators used in the present invention and color thereof are shown below.

Leucoethyl Nile Blue (Blue)
Leucomethyl Capryl Blue (Blue)
Leucotoluyl Blue (Purple)
Leuco diphenyl amine (Purple)
Leuco-N-methyldiphenylamine-p-sulfonic acid (Reddish purple)
Leuco phenyl anthranyl acid (Reddish purple)
Triphenyltetrazonium chloride (Red)
Methylviologen (Purple)
Leuco Safranine T (Red)
Leuco indigo sulfonic acid (Blue)
Leuco Phenosafranine (Red)
Leucomethylene Blue (Blue)
Leucodiphenylbenzidine (Purple)
Leuco Erioglaucine A (Yellowish green Red)
Leuco-p-nitrodiphenylamine (Purple)
Leucodiphenyl-o,o'-diphenylcarboxylic acid (Bluish purple)

e. Metal chlorides and oxides herein mentioned form visible marks by synergistic effect of heat generated upon application of electric current and electric action. For example, silver chloride in fine particle state is dispersed in a binder and therefrom a white color forming layer is formed on an electroconductive layer of cuprous iodide. In this recording sheet, AgCl is reduced to Ag by application of electric current to result in brownish black colored trails of recording needle.

The metal chlorides and oxides used as color forming component and formed color are shown below.

| Metal chlorides or oxides | Color of sheet | Color formed |
| --- | --- | --- |
| Lead chloride | White | Black |
| Nickel chloride (NiCl$_2$) | Light yellowish green | Black |
| Niobium chloride (NbCl$_2$) | Yellow | Greyish black |
| Beryllium chloride (BeCl$_2$) | White | Black |
| Silver chloride (AgCl) | White | Brownish black |
| Bismuth chloride (BiCl$_3$) | Yellowish grey | Black |
| Indium chloride (InCl$_3$) | White | Black |
| Antimony chloride (SbCl$_3$) | White | Black |
| Cuprous chloride (CuCl) | White | Brown |
| Thallium chloride (TlCl) | White | Black |
| Indium oxide (In$_2$O$_3$) | White | Black |
| Antimony oxide (Sb$_2$O$_3$) | White | Black |
| Zinc oxide (ZnO) | White | Black |
| Lead oxide (PbO) | Yellowish grey | Black |
| Cadmium oxide (CdO) | Brown | Black |
| Mercuric oxide (HgO) | Orange | Black |
| Bismuth oxide (Bi$_2$O$_3$) | Greyish white | Black |
| Selenium oxide (CeO) | Yellowish brown | Black |
| Vanadium pentoxide (V$_2$O$_5$) | Brown | Black |
| Aluminum oxide (Al$_2$O$_3$) | White | Greyish black |

2. BINDERS

Binders are used to disperse in fine particle state the color forming dyes and color forming agents, the organic spot test reagents and organic metal salts, etc. of the color forming layer or cuprous iodide of electroconductive layer and to impart them binding ability.

Since most of said color forming dyes, color forming agents, organic spot test reagents and cuprous iodide are water insoluble, water soluble binders are effective. By the water soluble binders the operation and treatment in production of recording sheet is made easy.

1. WATER SOLUBLE BINDERS

Hydroxyethylcellulose carboxymethylcellulose, methoxycellulose, polyvinyl alcohol, polyvinyl pyrrolidone, polyacrylamide, polyacrylic acid, gelatin, starch.

Water soluble and electroconductive film forming binders include polyelectrolytes which contribute to increase of electroconductivity of the recording sheet and are effective for decreasing voltage at recording. As said polyelectrolytes, the following cation type electrolytes and anion type electrolytes are used.

a. Cation type polyelectrolytes

Those which have the following functional groups are used.

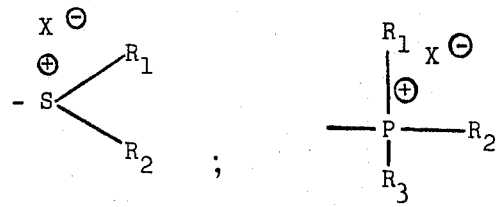

(wherein $R_1$, $R_2$ and $R_3$ are alkyl, allyl, aryl, acyl or alkylamino group and X is a halogen.)

Specific examples of these electrolytes are as follows:
Poly-2-acryloxyethyldimethyl sulfonium chloride

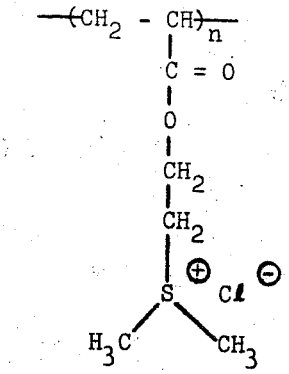

Polyglycidyltributyl phosphonium chloride

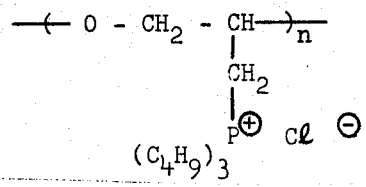

b. Anion type polyelectrolytes

Those which have the following functional groups are used.

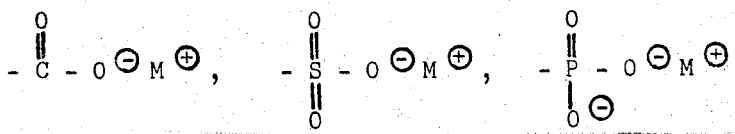

(wherein M is an alkali metal or an alkaline earth metal.)

Specific examples of these polyelectrolytes are as follows:

Sodium polymethyl acrylate

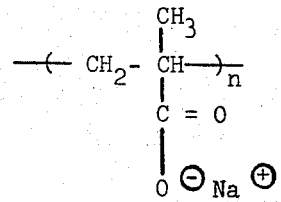

Sodium polystyrene sulfonate

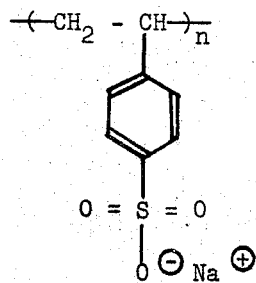

Sodium polyvinyl sulfonate

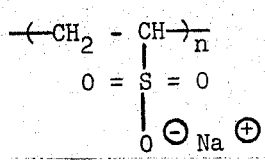

Potassium polyvinyl phosphate

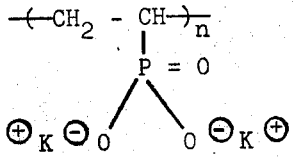

2. WATER INSOLUBLE BINDERS

As binders, those which are soluble in organic solvent may also be used. When, for example, color forming dyes and color forming agents are used as color forming layer, both must be separately dispersed in fine particle state in a binder and when either one of the two is dissolved in a solvent in which the binder is to be dissolved, color forming reaction takes place upon mixing of the two to lose function as recording medium. Therefore, solvents of the binders herein enumerated are naturally limited depending upon selection of color forming component.

Specific examples of water insoluble binders are shown below.

Natural rubber, synthetic rubber, chlorinated rubber, alkyd resins, styrene-butadiene copolymer, polybutyl methacrylate, low molecular weight polyethylene, polyvinyl butyral, phenolic resin, nitrocellulose.

The present invention will be illustrated in the following Examples. Examples 1 – 4 illustrate formation of an electroconductive layer with use of cuprous iodide and Examples 5 – 12 show construction of recording sheet using said electroconductive layer.

EXAMPLE 1

In this Example, cuprous iodide was directly deposited onto a support by vacuum evaporation and cuprous iodide of pure reagent was used. An art paper as a support was sticked on the inside wall of a bell jar. On the other hand, about 0.5 g of cuprous iodide was charged in a pot of quartz glass, round which a tungsten wire of 0.5 mm in diameter was coiled. When vapor pressure in the bell jar reached $7 \times 10^{-5}$ torr, an electric current of 10 – 15 mA was passed through said tungsten wire and after lapse of about 10 minutes, the current was switched off to complete vacuum evaporation. The resultant deposited paper was white and had a surface resistivity of $5 \times 10^3 - 2 \times 10^4 \Omega$. This paper turned yellow upon exposure to ultraviolet ray such as fluorescent lamp for several weeks, but showed no change in the resistivity.

EXAMPLE 2

Small particles of copper were charged in a basket of tungsten and were similarly deposited onto an art paper by vacuum evaporation under $5 \times 10^{-5}$ torr. Surface resistivity of thus copper-deposited paper was $2 - 3\Omega$. This paper was placed in a desiccator in which small particles of iodine were charged and then said desiccator was subjected to suction by an aspirator for 15 – 45 minutes. The copper deposited surface in red color gradually became white because copper reacted with iodine to produce cuprous iodide. Further continuation of suction rendered iodine excess to cause change of color into yellow. When this paper was allowed to stand in the air, the excess iodine was gradually released to restore the paper into white paper. Surface resistivity of thus obtained paper was $10^3 - 4 \times 10^3 \Omega$.

EXAMPLE 3

100 g of cuprous iodide was mixed with 100 cc of aqueous solution containing 4 percent by weight of polyvinyl alcohol (PVA 205 manufactured by Kurare K.K.) and they were ground and mixed in a ball mill of content volume of 500 ml for 24 hours. Thus obtained dispersion was coated on an art paper with a wire bar which was adjusted to form a coating film of 15 $\mu$ and the film was dried. Surface resistivity of the coated paper was $(2 - 5) \times 10^4 \Omega$. when a coated paper was produced in the same manner as mentioned above using water soluble binder, e.g., hydroxyethylcellulose, gelatin, carboxymethylcellulose, polyacrylamide, polyethylene oxide, polyvinylpyrrolidine, etc., the surface resistivity thereof was somewhat different from the former coated paper, but was in the same order.

EXAMPLE 4

100 gr of cuprous iodide was mixed with 100 cc of toluene solution containing 10 percent by weight of a 85 : 15 copolymer of styrene and butadiene and they were ground and mixed in a ball mill of a content volume of 500 ml for 24 hours. Thus obtained dispersion was coated on an art paper with a wire bar adjusted for form a coating film of 15 $\mu$ and this was dried. Surface resistivity of this coated paper was $(4 - 7) \times 10^4 \Omega$.

EXAMPLE 5

35 parts by weight of 3,6-dimethylfluorane (color forming dye) was mixed with 200 parts by weight of an aqueous solution containing 10 percent by weight of polyvinyl alcohol (PVA 205 manufactured by Kurare K.K.) and they were ground and mixed in a ball mill of a content volume 500 ml for 48 hours. Similarly, a dispersion of color forming agent was prepared by mixing an aqueous solution containing 10 percent by weight of polyvinyl alcohol with 35 parts by weight of $\beta$-naphthol as a color forming agent. The color forming dye and color forming agent in respective liquid were hardly dissolved and dispersed as fine particles of less than 5 $\mu$. One part by weight of the color forming dye dispersion and 10 parts by weight of color forming agent dispersion were mixed with a mixer. The color forming dye and color forming agent were dispersed as fine particles in the mixed solution and since the particles were surrounded with polyvinyl alcohol, the particles did not directly contact with each other. Thus obtained mixed solution as a solution for forming a color forming layer was coated on the deposited paper obtained in Example 1 with a wire bar adjusted to form a coating film of 8 - 10 $\mu$ and this was dried. Thereto was applied a direct current voltage of 70 V and recording was carried out as shown in FIG. 2 to obtain clear red record having a reflection density of 0.85. As the recording needle, a piano wire of 0.25 mm in diameter was used and as the face electrode, a carbon plate was used. The recording needle was moved at a speed of 200 mm/sec.

EXAMPLE 6

The mixed solution used for formation of color forming layer in Example 5 was coated on the deposited paper obtained in Example 3 in the same manner as in Example 5 and this was dried. To the resultant paper was applied a voltage of 400 V and recording was carried out under the same conditions as in Example 5 to obtain a red record having a reflection density of 0.5.

EXAMPLE 7

A mixed solution was prepared under the same conditions as in Example 5 except that ferric stearate and gallic acid were used as the color forming dye and color forming agent, respectively. The resultant solution was coated on the electroconductive paper obtained in Example 2 in a thickness of 8 - 10 $\mu$ and was dried.

To the coated paper was applied a direct current voltage of 700 V and recording was carried out by moving the needle to obtain a black record having a reflection density of 1.1.

EXAMPLE 8

35 parts by weight of Leucomethylene Blue was blended with 200 parts by weight of an aqueous solution containing 30 percent by weight of sodium polystyrene sulfate (Oligo Z manufactured by Tomoegawa Seishi K.K.) and they were ground and mixed in a ball mill of 500 ml for 48 hours. The Leucomethylene Blue was dispersed in thus obtained liquid as fine particles of less than 5 $\mu$. This mixed solution was coated on the electroconductive layer-coated paper obtained in Example 4 in a thickness of 8 - 10 $\mu$ and was dried. To the coated paper was applied a direct current voltage of 550 V and a recording needle as an anode was moved at a speed of 200 mm/sec. to obtain a blue recorded trace having a reflection density of 0.25.

EXAMPLE 9

200 parts by weight of lead chloride was blended with 200 parts by weight of a toluene solution containing 10 percent by weight of styrene/butadiene (85 : 15) copolymer and they were ground and mixed in a ball mill of content volume of 500 ml for 48 hours. This mixed solution was coated on the electroconductive paper obtained in Example 1 in a thickness of 10 $\mu$ and was dried. Thereto was applied a direct current voltage of 70 V and recording was carried out by moving a recording needle as a cathode to obtain a greyish black recorded trace having a reflection density of 0.4.

EXAMPLE 10

The mixed solution prepared in Example 5 was coated on a white paper in a thickness of 10 $\mu$. This coated paper which was the so-called heat sensitive color forming paper was sticked to inner face of a bell jar as in Example 2 and copper was vacuum evaporated to the heat sensitive layer coated face of the paper. This paper was placed in a desiccator and said copper was allowed to react with iodine while subjecting to suction with an aspirator to produce transparent and light yellow cuprous iodide. Thereto was applied a direct current voltage of 50 V and recording needle was moved at 200 mm/sec. to obtain a clear record having a reflection density of 0.9.

EXAMPLE 11

25 parts by weight of nickel stearate, 5 parts by weight of ethylcellulose and 100 parts by weight of acetone were charged in a ball mill of content volume of 500 ml and they were ground and dispersed for 24 hours. Similarly, 10 parts by weight of dimethylglyoxine, 5 parts by weight of ethylcellulose and 100 parts by weight of acetone were mixed to prepare a dispersion. The two dispersions were mixed in a weight ratio of 1 : 1 and were well agitated with a mixer. This mixed solution was coated on the electroconductive paper obtained in Example 4 in a thickness of 5 - 10 $\mu$ and was dried. Thus obtained recording paper formed a pink colored reocrd on light yellow ground upon application of electric current.

EXAMPLE 12

25 parts by weight of Crystal Violet Lactone, 5 parts by weight of styrene-butadiene copolymer resin and 100 parts by weight of toluene were ground in a ball mill for 24 hours to prepare a dispersion. Similarly, 25 parts by weight of Bisphenol A, 5 parts by weight of styrene-butadiene copolymer resin and 100 parts by weight of toluene were ground to prepare a dispersion. Then, the former dispersion and the latter dispersion were mixed in a weight ratio of 1 : 10 and were well agitated. The resultant mixed solution was coated on the electroconductive paper obtained in Example 3 in a thickness of 5 – 10 $\mu$ and was dried. Thus obtained recording paper formed a clear blue record on white ground upon application of electric current.

What is claimed is:

1. An electro-recording sheet having an electroconductive layer of cuprous iodide which has a surface resistivity of less than $10^6 \Omega$ at a temperature of 20°C and a relative humidity of 65 percent and a color forming layer provided in contact with said electroconductive layer and which forms a mark due to selective color formation or color change in the parts of said color formation layer to which electric current is applied through said electroconductive layer.

2. An electro-recording sheet according to claim 1, wherein the electroconductive layer comprises homogeneous component of only cuprous iodide wherein conductivity of said electroconductive layer is imparted by cuprous iodide.

3. An electro-recording sheet according to claim 1, wherein the electroconductive layer comprises binder and particles of cuprous iodide which are dispersed in said binder wherein conductivity of said electroconductive layer is imparted by cuprous iodide.

4. An electro-recording sheet according to claim 1, wherein the color forming layer comprises leuco form of triphenylmethane dyes or leuco form of fluoran dyes and an organic acid or a phenolic material which are separately dispersed in binders.

5. An electro-recording sheet according to claim 1, wherein the color forming layer comprises a metal salt and an organic spot test reagent which rapidly reacts with metal ion of said metal salt to form a visible reaction product which are separately dispersed in binders and either one of said two materials which has a lower melting point has a melting point of 70° – 150°C.

6. An electro-recording sheet according to claim 1, wherein the color forming layer comprises leuco form of an oxidation-reduction indicator dispersed in a binder.

7. An electro-recording sheet according to claim 1, wherein the color forming layer comprises a metal chloride or oxide which forms color or changes color with reduction upon application of electric current and which is dispersed in a binder.

8. An electro-recording sheet according to claim 1, which comprises
   a support of paper or plastic film,
   an electroconductive layer containing cuprous iodide provided on said support and
   a color forming layer comprising leuco form of triphenylmethane dyes or leuco form of fluoran dyes and an organic acid or a phenolic material dispersed in a binder which is provided on said electroconductive layer.

9. An electro-recording sheet according to claim 1, which comprises
   a support of paper or plastic film,
   an electroconductive layer containing cuprous iodide provided on said support, and
   a color forming layer comprising a metal salt and an organic spot test reagent dispersed in a binder which is provided on said electroconductive layer.

10. An electro-recording sheet according to claim 1, which comprises
    a support of paper or plastic film,
    an electroconductive layer containing cuprous iodide and
    a color forming layer comprising leuco form of an oxidation-reduction indicator dispersed in a binder which is provided on said electroconductive layer.

* * * * *